(12) United States Patent
Li

(10) Patent No.: US 10,754,181 B2
(45) Date of Patent: Aug. 25, 2020

(54) FLEXIBLE DISPLAY PANEL AND MANUFACTURING METHOD THEREOF, AND DISPLAY DEVICE

(71) Applicant: BOE TECHNOLOGY GROUP CO., LTD., Beijing (CN)

(72) Inventor: Haixu Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/657,434

(22) Filed: Oct. 18, 2019

(65) Prior Publication Data
US 2020/0124901 A1   Apr. 23, 2020

(30) Foreign Application Priority Data

Oct. 18, 2018  (CN) .......................... 2018 1 1216139

(51) Int. Cl.
*G02F 1/1333* (2006.01)
*G06F 1/16* (2006.01)
*H04M 1/02* (2006.01)

(52) U.S. Cl.
CPC ...... *G02F 1/133305* (2013.01); *G06F 1/1652* (2013.01); *H04M 1/0268* (2013.01); *G02F 2001/133302* (2013.01)

(58) Field of Classification Search
CPC . G02F 1/133305; G02F 1/652; H04M 1/0268
See application file for complete search history.

(56) References Cited

U.S. PATENT DOCUMENTS

2019/0129539 A1\* 5/2019 Kim ................... G01R 27/2605
2020/0026281 A1\* 1/2020 Xiao ......................... B60P 1/43

\* cited by examiner

*Primary Examiner* — Joseph L Williams
(74) *Attorney, Agent, or Firm* — Nath, Goldberg & Meyer; Joshua B. Goldberg

(57) ABSTRACT

The present disclosure provides a flexible display panel, which includes: a flexible substrate; and a first pattern layer and a second pattern layer on the flexible substrate, which are spaced apart from each other in a thickness direction of the flexible display panel. The first pattern layer is a stress neutral layer of the flexible display panel. The first pattern layer includes a plurality of first touch electrode lines and a plurality of second touch electrode lines in a same layer, the first touch electrode lines are arranged to intersect with the second touch electrode lines, the second touch electrode lines are disconnected at intersections with the first touch electrode lines, the second pattern layer includes a plurality of bridging lines, and the bridging lines are arranged to electrically connect parts of the second touch electrode lines disconnected at the intersections.

20 Claims, 4 Drawing Sheets

FLEXIBLE DISPLAY PANEL AND MANUFACTURING METHOD THEREOF, AND DISPLAY DEVICE

CROSS-REFERENCE TO RELATED APPLICATION

The present application claims priority to Chinese patent application No. 201811216139.4, filed on Oct. 18, 2018, the content of which is incorporated herein by reference in their entirety.

TECHNICAL FIELD

The present disclosure relates to the field of display devices, and in particular, to a flexible display panel, a display device including the flexible display panel, and a method of manufacturing the flexible display panel.

BACKGROUND

With the development of display technology, flexible display devices which have good flexibility and are bendable have appeared. In order to expand functions of the flexible display device and facilitate user's operations, a touch panel is generally integrated on the flexible display device.

The flexible display device can realize a large degree of bending, thereby expanding an application range of the flexible display device. However, in the flexible display device having the touch panel, the touch panel is easily broken or damaged due to multiple times of bending.

SUMMARY

A first aspect of the present disclosure provides a flexible display panel including a flexible substrate; a first pattern layer and a second pattern layer on the flexible substrate, the first pattern layer and the second pattern layer being spaced apart with each other in a thickness direction of the flexible display panel, wherein the first pattern layer includes a plurality of first touch electrode lines and a plurality of second touch electrode lines, which are in a same layer, the first touch electrode lines are arranged to intersect with the second touch electrode lines, the second touch electrode line is disconnected at intersections with the first touch electrode lines, the second pattern layer includes a plurality of bridging lines, the bridging lines are arranged to electrically connect parts of the second touch electrode lines disconnected at the intersections, and the first pattern layer is a stress neutral layer of the flexible display panel.

According to an embodiment of the present disclosure, the first pattern layer further comprises display driving lines which are in the same layer as the first touch electrode lines and the second touch electrode lines.

According to an embodiment of the present disclosure, the display driving lines comprise data lines.

According to an embodiment of the present disclosure, an extending direction of the first touch electrode lines is parallel to an extending direction of the display driving lines, and the display driving lines are arranged in gaps where the second touch electrode lines are disconnected, and orthographic projections of the bridging lines on the flexible substrate partially overlaps with orthographic projections of the first touch electrode lines on the flexible substrate.

According to an embodiment of the present disclosure, the first touch electrode lines are configured to receive display driving signals in a display stage and receive touch signals in a touch stage.

According to an embodiment of the present disclosure, the flexible display panel further includes an insulating layer between the first pattern layer and the second pattern layer, and the bridging lines electrically connect the parts of the second touch electrode lines disconnected at the intersections through via holes penetrating through the insulating layer.

According to an embodiment of the present disclosure, the flexible display panel further includes a light emitting diode, the light emitting diode includes a first electrode and a second electrode, and one of the first electrode and the second electrode is in the same layer as the bridging lines.

According to an embodiment of the present disclosure, the flexible display panel further includes a light emitting diode, the light emitting diode includes a first electrode and a second electrode, and one of the first electrode and the second electrode is in the same layer as the first touch electrode lines and the second touch electrode lines.

According to an embodiment of the present disclosure, the flexible display panel further includes a pixel defining layer, the pixel defining layer includes a partition portion and a plurality of pixel openings each surrounded by the partition portion, and orthographic projections of the first touch electrode lines and the second touch electrode lines on the flexible substrate and orthographic projections of the bridging lines on the flexible substrate are both within an orthographic projection of the partition portion on the flexible substrate.

According to an embodiment of the present disclosure, the flexible display panel further includes a third pattern layer and an auxiliary signal line on a side of the third pattern layer away from the flexible substrate, the third pattern layer includes gate lines, and the auxiliary signal lines and the third pattern layer form a capacitor.

A second aspect of the present disclosure provide a display device including a flexible display panel, wherein the flexible display panel is the flexible display panel described above.

A third aspect of the present disclosure provides a manufacturing method of a flexible display panel, including: providing a flexible substrate; forming a first pattern layer; and forming a second pattern layer, wherein the second pattern layer and the first pattern layer are spaced apart from each other in a thickness direction of the flexible display panel, wherein the first pattern layer is formed to comprise a plurality of first touch electrode lines and a plurality of second touch electrode lines arranged in a same layer, the first touch electrode lines are arranged to intersect with the second touch electrode lines, the second touch electrode line is disconnected at intersections with the first touch electrode lines, the second pattern layer includes a plurality of bridging lines, the bridging lines are formed to electrically connect parts of the second touch electrode lines disconnected at the intersections, and the first pattern layer is a stress neutral layer of the flexible display panel.

According to an embodiment of the present disclosure, the first pattern layer is further formed to comprise display driving lines arranged in the same layer as the first touch electrode lines and the second touch electrode lines.

According to an embodiment of the present disclosure, the display driving lines comprise data lines.

According to an embodiment of the present disclosure, an extending direction of the first touch electrode lines is parallel to an extending direction of the display driving lines, the display driving lines are arranged in gaps where the second touch electrode lines are disconnected, and orthographic projections of the bridging lines on the flexible substrate partially overlaps with orthographic projections of the first touch electrode lines on the flexible substrate.

According to an embodiment of the present disclosure, the first touch electrode lines are configured to receive display driving signals in a display stage and receive touch signals in a touch stage.

According to an embodiment of the present disclosure, the method further includes: forming an insulating layer between the first pattern layer and the second pattern layer, and the bridging lines electrically connect the parts of the second touch electrode lines disconnected at the intersections through via holes penetrating through the insulating layer.

According to an embodiment of the present disclosure, the method further includes: forming a first electrode and a second electrode of a light emitting diode, wherein one of the first electrode and the second electrode is formed in the same layer as the bridging lines.

According to an embodiment of the present disclosure, the method further includes: forming a first electrode and a second electrode of a light emitting diode, wherein one of the first electrode and the second electrode is formed in the same layer as the first touch electrode lines and the second touch electrode lines.

According to an embodiment of the present disclosure, the method further includes: forming a pixel defining layer including a partition portion and a plurality of pixel openings each surrounded by the partition portion, and orthographic projections of the first touch electrode lines and the second touch electrode lines on the flexible substrate and orthographic projections of the bridging lines on the flexible substrate are both located within an orthographic projection of the partition portion on the flexible substrate.

BRIEF DESCRIPTION OF THE DRAWINGS

The accompanying drawings are included to provide a further understanding of the disclosure and constitute a part of this specification, and are used to explain the disclosure together with the following specific embodiments of the disclosure and not to limit the disclosure. In the accompanying drawings.

DETAILED DESCRIPTION

The specific embodiments of the present disclosure will be described in detail below with reference to the accompanying drawings. It should be understood that the specific embodiments described herein are for illustrative purposes only and are not intended to limit the disclosure.

In a flexible display device integrated with a touch panel, a touch layer is generally arranged at an outermost layer of a flexible display panel, so the touch layer is far away from a stress neutral layer of the flexible display panel, and therefore, when the flexible display device is bent to a large degree, the touch layer is greatly affected by a bending force, and phenomena such as disconnection easily occur, thereby causing a fault.

"Stress neutral layer" means a layer having a stress value of zero in a plate-like member that is bent and deformed. In the plate-like member, a tensile stress is generated in a portion of the plate-like member at an outside of the stress neutral layer, and a compressive stress is generated in a portion of the plate-like member at an inside of the stress neutral layer. At both inner and outer surfaces of the plate-like member, the stress is greatest and the stress deformation is also greatest, and thus breakage is most likely to occur.

Figure 1:
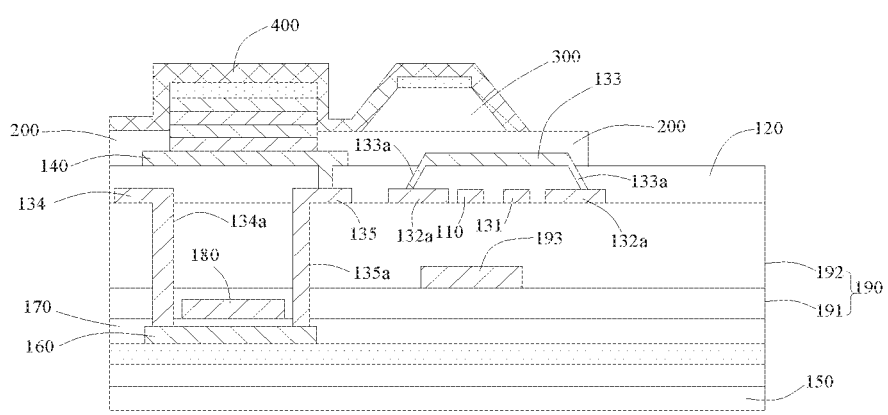
FIG. 1 is a schematic diagram of a flexible display panel according to an embodiment of the present disclosure.

One aspect of the present disclosure provides a flexible display panel. FIG. 1 is a schematic diagram of a flexible display panel according to an embodiment of the present disclosure.

As shown in FIG. 1, the flexible display panel includes a flexible substrate 150, and an active pattern layer, a gate insulating layer 170, a third pattern layer, a second insulating layer 190, a first pattern layer, a first insulating layer 120, a second pattern layer, a pixel defining layer, an organic light emitting diode and an encapsulation layer 400 sequentially formed on the substrate 150.

According to an embodiment of the present disclosure, the first pattern layer is spaced apart from the second pattern layer in a thickness direction of the flexible display panel, and the first pattern layer is a stress neutral layer of the flexible display panel. The first pattern layer includes a plurality of first touch electrode lines 131 and a plurality of second touch electrode lines 132 arranged in a same layer, the first touch electrode lines 131 and the second touch electrode lines 132 are arranged to intersect with each other, and the second touch electrode line is disconnected at intersections with the first touch electrode lines. The second pattern layer includes a plurality of bridging lines 133, and the bridging lines 133 are arranged to electrically connect parts of the second touch electrode lines 132 disconnected at the intersections.

According to an embodiment of the present disclosure, the description that members arranged in a same layer described herein indicates that members are formed by a same patterning process and each member is located in substantially the same level with respect to the substrate.

As shown in FIG. 1, the second touch electrode lines 132 are disconnected at the intersections with the first touch electrode lines 131 to each include a plurality of touch electrodes 132a spaced apart from each other, and two touch electrodes 132a adjacent at one intersection are electrically connected through a bridging line 133.

According to an embodiment of the present disclosure, the first pattern layer may further include a plurality of display driving lines 110 arranged in the same layer as the first touch electrode lines 131 and the second touch electrode lines 132, an extending direction of the display driving lines 110 is parallel to an extending direction of the first touch electrode lines 131, and the display driving lines 110 are located in gaps where the second touch electrode lines 132 are disconnected, that is, a display driving line 110 is located between two touch electrodes 132a adjacent at the intersection. The second pattern layer may further include a plurality of first electrodes 140 arranged in the same layer as the bridging lines 133, and the plurality of first electrodes 140 are used to constitute light emitting diodes, for example, organic light emitting diodes. In other words, the flexible display panel according to an embodiment of the present disclosure may be a flexible organic light emitting diode display panel, and the first electrodes 140 may be anodes of the organic light emitting diodes or cathodes of the organic light emitting diodes.

Although FIG. 1 shows that the first touch electrode lines 131 and the second touch electrode lines 132 are arranged at the same layer as the display driving lines 110, and the bridging lines 133 are arranged at the same layer as the first electrodes 140, the embodiments of the present disclosure are not limited thereto. In some embodiments, the first touch electrode lines 131 and the second touch electrode lines 132 may be arranged at the same layer as other wirings, for example, auxiliary signal lines 193, and the bridging lines 133 may also be arranged in other layer different from the first pattern layer, as long as the bridging lines 133 can electrically connect the disconnected parts of the second touch electrode lines 132.

According to an embodiment of the present disclosure, the first touch electrode lines 131 may also be disconnected at intersections with other wirings, in such a case, bridging lines for electrically connecting the disconnected parts of the first touch electrode lines 131 may be arranged in a layer different from a layer in which bridging lines for electrically connecting the disconnected parts of the second touch electrode lines 132 are located.

In the flexible display panel according to an embodiment of the present disclosure, the plurality of first touch electrode lines 131 and the plurality of second touch electrode lines 132 are arranged inside the flexible display panel, instead of in the outermost layer of the flexible display panel, so that the first touch electrode lines 131 and the second touch electrode lines 132 can be closer to the stress neutral layer of the flexible display panel, or even be located in the stress neutral layer of the flexible display panel.

Because the first pattern layer including the display driving lines 110, the first touch electrode lines 131 and the second touch electrode lines 132 arranged in the same layer is located inside the flexible display panel, rather than at the outer side of the flexible display panel, the display driving lines 110, the first touch electrode lines 131 and the second touch electrode lines 132 are closer to the stress neutral layer, and even located in the stress neutral layer. Therefore, when the flexible display panel according to an embodiment of the disclosure is bent and deformed, the stress and the stress deformation that the display driving lines 110, the first touch electrode lines 131 and the second touch electrode lines 132 suffer are smaller, and are even zero, and therefore, the flexible display panel is less likely to be broken, and service life of the flexible display panel can be prolonged.

Moreover, since the first touch electrode lines 131 and the second touch electrode lines 132 are integrated in the flexible display panel instead of being attached to the outer side of the flexible display panel, the overall thickness of the display device including the flexible display panel can be reduced, which is conducive to realization of thin and light products.

Compared with the case of attaching the touch panel including the first touch electrode lines and the second touch electrode lines on a light emitting surface of the organic light emitting diode, the thickness of the flexible display panel according to an embodiment of the disclosure is reduced by at least 100 μm, for example.

According to an embodiment of the present disclosure, one of the first touch electrode line 131 and the second touch electrode line 132 is used for receiving touch driving signals, and the other of the first touch electrode line 131 and the second touch electrode line 132 is used for receiving touch sensing signals. The bridging line 133 may form a capacitor with a portion of the first touch electrode line 131 at the intersection of the first touch electrode line 131 and the second touch electrode line 132, so as to determine positions of touch points.

According to an embodiment of the present disclosure, since the first pattern layer includes the display driving lines 110, the first touch electrode lines 131 and the second touch electrode lines 132 arranged in the same layer, the first touch electrode lines 131, the second touch electrode lines 132 and the display driving lines 110 can be formed through one patterning process. Since the second pattern layer includes the first electrodes 140 and the bridging lines 133 arranged in the same layer, the first electrodes 140 and the bridging lines 133 may be formed through one patterning process. Therefore, it is possible to simplify manufacturing processes of the flexible display panel and reduce a manufacturing cost of the flexible display panel when manufacturing the flexible display panel according to an embodiment of the present disclosure.

The present disclosure is not intended to limit to particular types of the display driving lines 110. For example, the display driving lines 110 may be data lines, gate lines, or any lines capable of introducing, to pixel units, signals for driving light emitting diodes in the flexible display panel to emit light. For example, the display driving lines 110 may be data lines.

The first pattern layer may further include a plurality of source electrodes 134 and a plurality of drain electrodes 135, and the source electrodes 134 and the drain electrodes 135 are insulated from the first touch electrode lines 131 and the second touch electrode lines 132.

The structure of the flexible display panel shown in FIG. 1 will be further described with reference to FIGS. 2 to 5.

Figure 2:
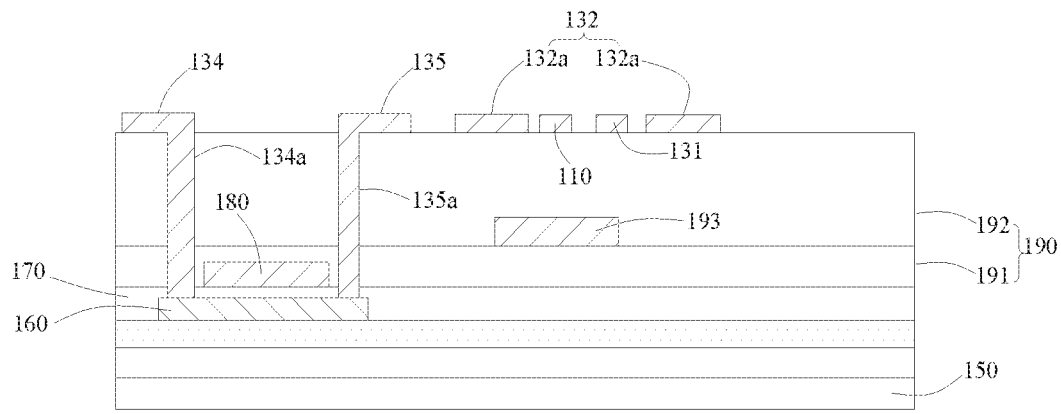
FIG. 2 is a schematic diagram of the flexible display panel shown in FIG. 1 without a first insulating layer and layers above the first insulating layer.
Figure 3:
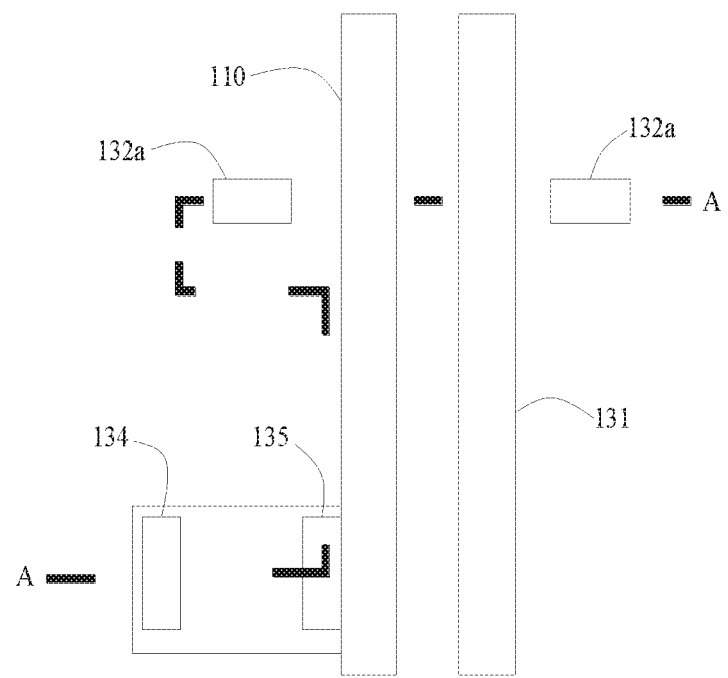
FIG. 3 is a top view of the flexible display panel shown in FIG. 2.
Figure 4:
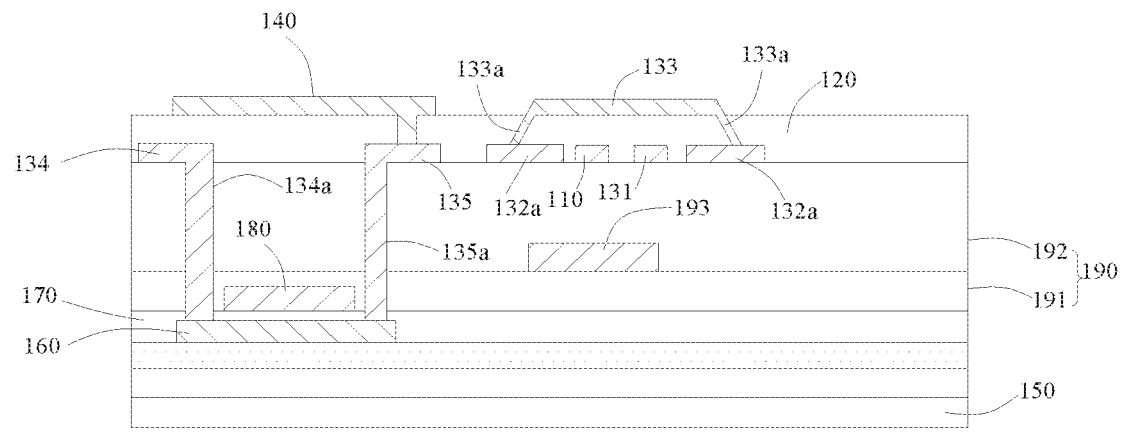
FIG. 4 is a schematic diagram of the flexible display panel shown in FIG. 1 without a pixel definition layer and the layers above the pixel definition layer.

FIG. 2 is a schematic diagram of the flexible display panel shown in FIG. 1 without a first insulating layer and layers above the first insulating layer, FIG. 3 is a top view of the flexible display panel shown in FIG. 2, and FIG. 2 is a cross sectional view taken along line A-A of FIG. 3. FIG. 4 is a schematic diagram of the flexible display panel shown in FIG. 1 without a pixel definition layer and the layers above the pixel definition layer, FIG. 5 is a top view of the flexible display panel shown in FIG. 4, and FIG. 4 is a cross sectional view taken along line A-A of FIG. 5.

As shown in FIGS. 2 and 3, the first pattern layer includes a display driving line 110, a first touch electrode line 131, and a second touch electrode line 132 arranged in a same layer, the first touch electrode line 131 and the second touch electrode line 132 are arranged to intersect with each other, the second touch electrode line 132 is disconnected into two adjacent touch electrodes 132a at an intersection with the first touch electrode line 131, an extending direction of the display driving line 110 is parallel to an extending direction of the first touch electrode line 131, and the display driving line 110 is located in a gap where the second touch electrode line 132 is disconnected, that is, the display driving line 110 is located between the two adjacent touch electrodes 132a.

Figure 5:
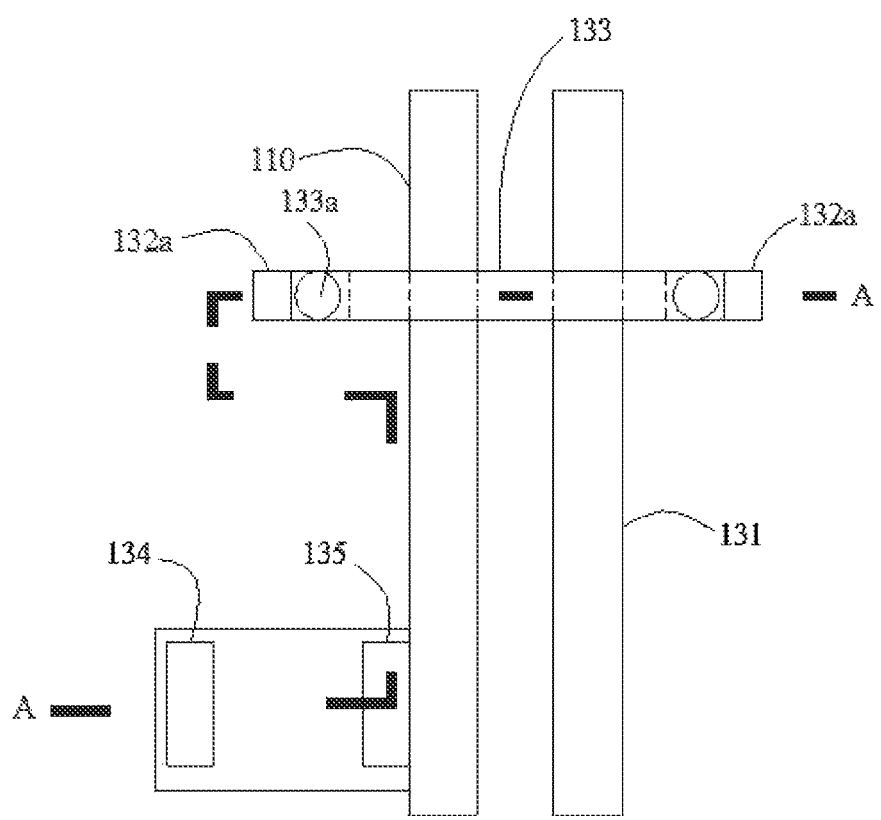
FIG. 5 is a top view of the flexible display panel shown in FIG. 4.

As shown in FIGS. 4 and 5, the two adjacent touch electrodes 132a may be electrically connected by a bridging line 133. As shown in FIG. 5, an orthographic projection of the bridging line 133 electrically connecting the two adjacent touch electrodes 132a on the flexible substrate 150 of the flexible display panel partially overlaps with an orthographic projection of the first touch electrode line 131 on the flexible substrate 150.

The bridging line 133 may form a capacitor with the first touch electrode line 131, that is, the bridging line 133 may form a capacitor with a portion of the first touch electrode line 131 corresponding to the overlapped portion. The signal in the bridging line 133 is the same as the signal received by the second touch electrode line 132, and position coordinate of the touch point can be determined by the change of signal on one of the second touch electrode line 132 and the first touch electrode line 131, which serves as the touch sensing line.

In order to simplify the structure of the flexible display panel, the first touch electrode lines 131 may be also used as display driving lines, that is, the first touch electrode lines 131 may be used for receiving display driving signals in a display stage and receiving touch signals in a touch stage. In this case, the first touch electrode lines 131 are also used as the display driving lines, which is beneficial to improving resolution of the flexible display panel. Since a total amount of wirings arranged in the flexible display panel is reduced, a larger arrangement space can be provided for pixel units, so that more organic light emitting diodes can be arranged in the flexible display panel, and the resolution of the flexible display panel can be improved.

In some embodiments, a duration of a touch stage in one operating period is less than that of a display stage in one operating period. Typically, a hand touching of a human on the flexible display device may be recognized when a duration of the hand touching is greater than ¼ seconds. However, according to an embodiment of the present disclosure, only one touch signal is required every ¼ seconds. For a display device with the signal frequency of 60 Hz, 60 signals exist per second, and the touch signals only need to occupy 4 of the 60 signals. After average distribution of the touch signals, there may be 15 display signals between two adjacent touch signals.

Figure 6:
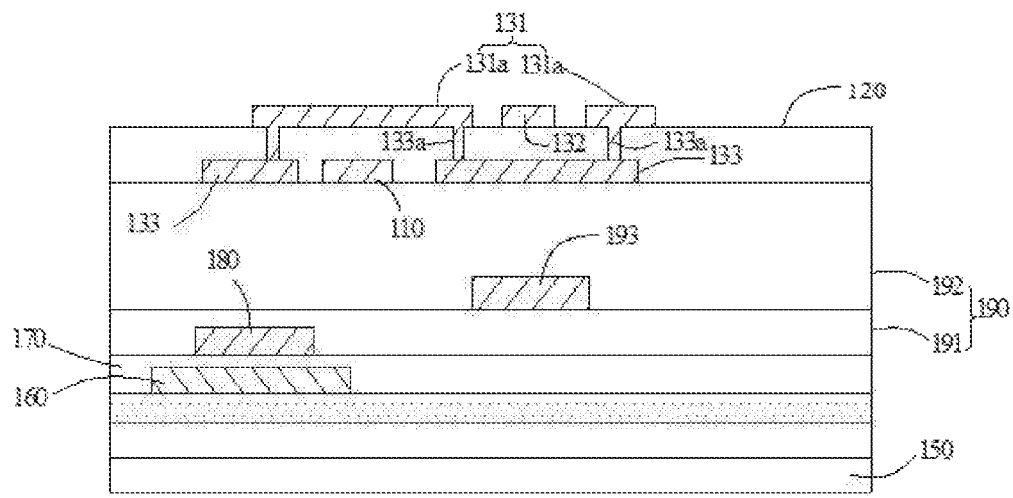
FIG. 6 is a schematic diagram of a flexible display panel according to another embodiment of the present disclosure.

FIG. 6 is a schematic diagram of a flexible display panel according to another embodiment of the present disclosure.

Unlike the first pattern layer shown in FIG. 1 further including the display driving lines 110 arranged in the same layer as the first and second touch electrode lines 131 and 132, in the flexible display panel shown in FIG. 6, the first pattern layer does not include the display driving lines 110, and instead, the second pattern layer includes the display driving lines 110 arranged in the same layer as the bridging lines 133.

As shown in FIG. 6, a first touch electrode line 131 is arranged to intersect with a second touch electrode line 132, and the first touch electrode line 131 is disconnected into a plurality of touch electrodes 131a at intersections where the first touch electrode line 131 intersects with the second touch electrode line 132. The extending direction of the second touch electrode line 132 is parallel to the extending direction of the display driving line 110. The layer where the bridging line 133 and the display driving line 110 are located is different from the layer where the first touch electrode line 131 and the second touch electrode line 132 are located. The bridging line 133 is used for electrically connecting two touch electrodes 131a adjacent to each other at the intersection and a capacitor is formed between the bridging line 133 and the second touch electrode line 132.

According to an embodiment of the present disclosure, the specific structure of the light emitting diode is not particularly limited, for example, the light emitting diode may be a top emission organic light emitting diode, and in such a case, the first pattern layer is located between the flexible substrate 150 of the flexible display panel and the second pattern layer.

The flexible display panel includes a first insulating layer 120 arranged between the first pattern layer and the second pattern layer, and the bridging lines 133 are electrically connected to the corresponding touch electrodes through via holes penetrating through the first insulating layer 120.

In the flexible display panel shown in FIG. 1, the bridging line 133 electrically connects two adjacent touch electrodes 132a through via holes 133a penetrating through the first insulating layer 120. In the flexible display panel shown in FIG. 6, the bridging line 133 electrically connects two adjacent touch electrodes 131a through via holes 133a penetrating through the first insulating layer 120.

The flexible display panel further includes a pixel defining layer including a partition portion 200 and a plurality of pixel openings each surrounded by the partition portion 200. Orthographic projections of the first touch electrode lines 131 and the second touch electrode lines 132 on the flexible substrate are located in an orthographic projection of the partition portion 200 on the flexible substrate, so that an aperture ratio of the flexible display panel can be improved. Orthographic projections of the bridging lines 133 on the flexible substrate are within the orthographic projection of the partition portion 200 on the flexible substrate. In the flexible display panel, each pixel opening includes one first electrode 140. Each pixel opening also includes a hole injection layer, a light emitting layer, a hole transport layer, an electron transport layer and a second electrode which are sequentially arranged along the direction far away from the flexible substrate, thereby forming a light emitting diode together with the first electrode 140. One of the first electrode 140 and the second electrode is an anode, and the other of the first electrode 140 and the second electrode is a cathode.

In order to prevent the organic light emitting diodes from being damaged when the flexible display panel is packaged, in some embodiments, the flexible display panel may further include a spacer 300 arranged on the partition portion 200 of the pixel defining layer so as not to shield the organic light emitting diodes.

In order to protect the flexible display panel, the flexible display panel further includes an encapsulation layer 400 covering the entire flexible display panel.

According to an embodiment of the present disclosure, as shown in FIG. 1 and/or FIG. 6, the flexible display panel further includes an active pattern layer, a gate insulating layer 170 covering the active pattern layer, a third pattern layer formed on the gate insulating layer 170, and a second insulating layer 190 covering the third pattern layer. The first pattern layer is formed on the second insulating layer 190. The third pattern layer includes a plurality of gate electrodes 180 and a plurality of gate lines (not shown), the active pattern layer includes a plurality of active layers 160, source electrodes 134 are connected to corresponding active layers 160 through source via holes 134a penetrating through the second insulating layer 190 and the gate insulating layer 170, and drain electrodes 135 are connected to corresponding active layers 160 through drain via holes 135a penetrating through the second insulating layer 190 and the gate insulating layer 170.

The source electrodes 134, the drain electrodes 135, the gate electrodes 180 and the active layers 160 may form thin film transistors. As shown in FIGS. 1 and 6, the flexible display panel includes the flexible substrate 150 on which the active pattern layer is formed. According to an embodiment of the present disclosure, the active pattern layer may be directly formed on the flexible substrate 150, or a buffer layer may be formed on the flexible substrate 150 first, and then the active pattern layer may be formed on the buffer layer.

The second insulating layer 190 may include a first interlayer insulating layer 191 covering the third pattern layer and a second interlayer insulating layer 192 covering a layer where the auxiliary signal lines 193 are located, auxiliary signal lines 193 are arranged on the first interlayer insulating layer 191 and the first pattern layer is formed on the second interlayer insulating layer 192. The auxiliary signal line 193 functions to form a capacitor with the third pattern layer to stabilize signals supplied to the thin film transistors including the active layers, the gate electrodes, the source electrodes, and the drain electrodes.

A second aspect of the present disclosure provides a display device including a flexible display panel according to an embodiment of the present disclosure.

As described above, the flexible display panel has a small thickness and a long service life, and thus the display device also has advantages of a small thickness and a long service life. In the present disclosure, the specific structure of the display device is not particularly limited. For example, the display device may be an electronic device such as a wearable device, a computer, a mobile phone or the like.

Figure 7:
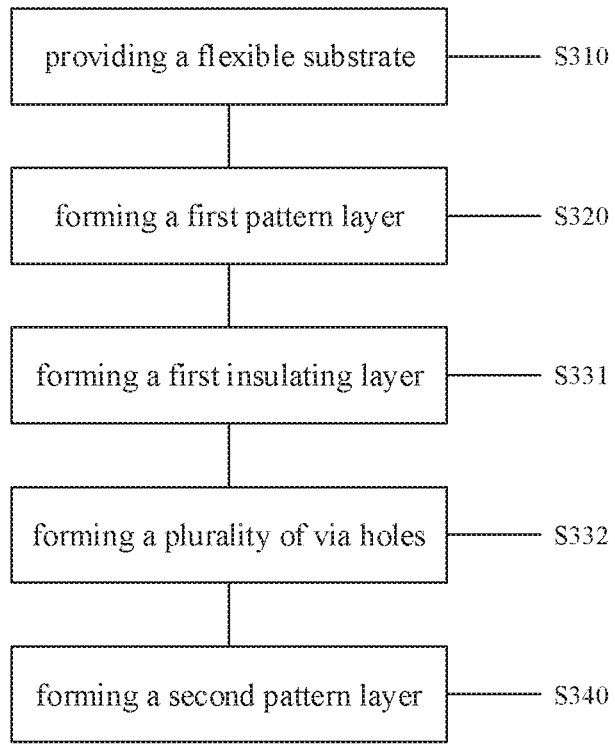
FIG. 7 is a flowchart of a method of manufacturing a flexible display panel according to an embodiment of the present disclosure.

FIG. 7 is a flowchart of a method of manufacturing a flexible display panel according to an embodiment of the present disclosure, and as shown in FIG. 7, the manufacturing method includes steps S310 to S340.

In step S310, a flexible substrate is provided.

In step S320, a first pattern layer is formed.

In step S340, a second pattern layer is formed, and the second pattern layer is spaced apart from the first pattern layer in a thickness direction of the flexible display panel.

According to an embodiment of the present disclosure, the first pattern layer includes a plurality of first touch electrode lines and a plurality of second touch electrode lines, the first touch electrode lines and the second touch electrode lines are arranged to intersect with each other, the second touch electrode line is disconnected at intersections with the first touch electrode lines, the second pattern layer includes a plurality of bridging lines, the bridging lines are arranged to electrically connect parts of the second touch electrode lines disconnected at the intersections, and the first pattern layer is a stress neutral layer of the flexible display panel.

According to an embodiment of the present disclosure, the first pattern layer further includes display driving lines arranged in the same layer as the first touch electrode lines and the second touch electrode lines. The display driving lines include data lines.

According to an embodiment of the disclosure, an extending direction of the first touch electrode lines is parallel to an extending direction of the display driving lines, and orthographic projections of the bridging lines on the flexible substrate partially overlaps with orthographic projections of the corresponding first touch electrode lines on the flexible substrate.

According to an embodiment of the disclosure, the first touch electrode lines are configured to receive display driving signals in a display stage and receive touch signals in a touch stage.

According to an embodiment of the present disclosure, the manufacturing method further includes arranging an insulating layer between the first pattern layer and the second pattern layer, and the bridging lines electrically connect parts of the second touch electrode lines disconnected at the intersections through via holes penetrating through the insulating layer.

According to an embodiment of the disclosure, the manufacturing method further includes forming a first electrode and a second electrode of a light emitting diode, wherein one of the first electrode and the second electrode is arranged in the same layer as the bridging lines, or arranged in the same layer as the first touch electrode lines and the second touch electrode lines.

According to an embodiment of the disclosure, the manufacturing method further includes forming a pixel defining layer, the pixel defining layer includes a partition portion and a plurality of pixel openings each surrounded by the partition portion, orthographic projections of the first touch electrode lines and the second touch electrode lines on the flexible substrate and orthographic projections of the bridging lines on the flexible substrate are located within an orthographic projection of the partition portion on the flexible substrate, and orthographic projections of the pixel openings on the flexible substrate are located within orthographic projections of the first electrodes on the flexible substrate.

The flexible display panel provided by the present disclosure can be manufactured by the above manufacturing method.

As described above, the bridging lines bridge the corresponding touch electrodes through via holes penetrating through the insulating layer. Therefore, the manufacturing method further includes the following steps performed between step S320 and step S340.

In step S331, a first insulating layer is formed.

In step S332, via holes penetrating through the first insulating layer is formed, and positions of the via holes correspond to positions of ends of the second touch electrode lines disconnected at the intersections.

When the second pattern layer is formed in step S340, the material of the second pattern layer fills the via holes, and electrically connects parts of the second touch electrode lines disconnected by the bridging lines.

According to an embodiment of the disclosure, the first touch electrode lines can be reused as display driving lines without additionally arranging the display driving lines, instead of the arrangement that the first touch electrode lines and the second touch electrode lines are arranged in the same layer as the display driving lines and the extending direction of the first touch electrode lines is parallel to the extending direction of the display driving lines.

The first pattern layer further comprises a plurality of source electrodes and a plurality of drain electrodes, and the source electrodes and the drain electrodes are insulated from the first touch electrode lines and the second touch electrode lines.

The manufacturing method includes, prior to the step of forming the first pattern layer, the following steps of:

forming an active pattern layer on a flexible substrate, the active pattern layer including a plurality of active layers; forming a gate insulating layer on the active pattern layer; forming a third pattern layer on the gate insulating layer, the third pattern layer including a plurality of gate electrodes and a plurality of gate lines; forming a second insulating layer on the gate insulating layer; and forming source via holes and drain via holes in the gate insulating layer and the second insulating layer, the source via holes and the drain via holes both penetrating through the second insulating layer.

The manufacturing method further includes steps of connecting the source electrodes with corresponding active layers through the source via holes and connecting the drain electrodes with corresponding active layers through the drain via holes after the step of forming the first pattern layer is finished.

The manufacturing method further includes, after the step of forming the second pattern layer, the following steps of:

forming a pixel defining layer, the pixel defining layer including a partition portion and a plurality of pixel openings each surrounded by the partition portion, each pixel opening encompasses one first electrode in the second pattern layer, the first touch electrode lines and the second touch electrode lines are positioned below the partition portion, and the bridging lines are positioned below the partition portion.

In order to form the flexible display panel shown in FIGS. 1 and 6, after the pixel defining layer is formed, the manufacturing method further includes the following steps of: forming a hole injection pattern including a plurality of hole injection layers, each pixel opening being provided therein with a hole injection layer; forming a light emitting pattern including a plurality of light emitting layers, each pixel opening being provided therein with a light emitting layer; forming a hole transport pattern including a plurality of hole transport layers, each pixel opening being provided therein with a hole transport layer; forming an electron transport pattern including a plurality of electron transport layers, each pixel opening being provided therein with an electron transport layer; and forming second electrodes.

The first electrode in the second pattern layer and the hole injection layer, the light emitting layer, the hole transport layer, the electron transport layer, the second electrode in the pixel opening form the light emitting diode.

The manufacturing method further includes a step of forming a spacer pattern including a plurality of spacers after the step of forming the pixel defining layer and before the step of forming the second electrodes.

The manufacturing method further includes a step of forming an encapsulation layer after the step of forming the second electrode.

The method of manufacturing a flexible display panel according to an embodiment of the present disclosure is used to manufacture a flexible display panel, and thus step S310 includes forming a flexible substrate on a rigid substrate, and in such a case, the manufacturing method further includes peeling the flexible substrate off the rigid substrate after the step of forming an encapsulation layer.

It is to be understood that the above embodiments are merely exemplary embodiments employed to explain the principles of the present disclosure, and the present disclosure is not limited thereto. Various modifications and improvements may be made to those skilled in the art without departing from the spirit and scope of the disclosure, and are intended to be within the scope of the disclosure.

The invention claimed is:

1. A flexible display panel comprising:
a flexible substrate;
a first pattern layer and a second pattern layer on the flexible substrate, the first pattern layer and the second pattern layer being spaced apart from each other in a thickness direction of the flexible display panel,
wherein the first pattern layer comprises a plurality of first touch electrode lines and a plurality of second touch electrode lines, which are in a same layer, the first touch electrode lines are arranged to intersect with the second touch electrode lines, the second touch electrode line is disconnected at intersections with the first touch electrode lines, the second pattern layer comprises a plurality of bridging lines, the bridging lines are configured to electrically connect parts of the second touch electrode lines disconnected at the intersections, and
the first pattern layer is a stress neutral layer of the flexible display panel.

2. The flexible display panel of claim 1, wherein the first pattern layer further comprises display driving lines which are in the same layer as the first touch electrode lines and the second touch electrode lines.

3. The flexible display panel of claim 2, wherein the display driving lines comprise data lines.

4. The flexible display panel of claim 2, wherein an extending direction of the first touch electrode lines is parallel to an extending direction of the display driving lines, and the display driving lines are arranged in gaps where the second touch electrode lines are disconnected, and orthographic projections of the bridging lines on the flexible substrate partially overlap with orthographic projections of the first touch electrode lines on the flexible substrate.

5. The flexible display panel of claim 1, wherein the first touch electrode lines are configured to receive display driving signals in a display stage and receive touch signals in a touch stage.

6. The flexible display panel of claim 1, further comprising an insulating layer between the first pattern layer and the second pattern layer, wherein the bridging lines electrically connect the parts of the second touch electrode lines disconnected at the intersections through via holes penetrating through the insulating layer.

7. The flexible display panel of claim 1, further comprising a light emitting diode, wherein the light emitting diode comprises a first electrode and a second electrode, and one of the first electrode and the second electrode is in the same layer as the bridging lines.

8. The flexible display panel of claim 1, further comprising a light emitting diode, wherein the light emitting diode comprises a first electrode and a second electrode, and one of the first electrode and the second electrode is in the same layer as the first touch electrode lines and the second touch electrode lines.

9. The flexible display panel of claim 1, further comprising a pixel defining layer, wherein the pixel defining layer comprises a partition portion and a plurality of pixel openings each surrounded by the partition portion, and orthographic projections of the first touch electrode lines and the second touch electrode lines on the flexible substrate and orthographic projections of the bridging lines on the flexible substrate are both within an orthographic projection of the partition portion on the flexible substrate.

10. The flexible display panel of claim 3, further comprising a third pattern layer and an auxiliary signal line on a side of the third pattern layer away from the flexible substrate, wherein the third pattern layer comprises gate lines, and the auxiliary signal line and the third pattern layer form a capacitor.

11. A display device comprising a flexible display panel, wherein the flexible display panel is the flexible display panel of claim 1.

12. A manufacturing method of a flexible display panel, comprising:
providing a flexible substrate;
forming a first pattern layer;

forming a second pattern layer, wherein the second pattern layer and the first pattern layer are spaced apart from each other in a thickness direction of the flexible display panel, wherein the first pattern layer is formed to comprise a plurality of first touch electrode lines and a plurality of second touch electrode lines arranged in a same layer, the first touch electrode lines are arranged to intersect with the second touch electrode lines, the second touch electrode line is disconnected at intersections with the first touch electrode lines, the second pattern layer is formed to comprise a plurality of bridging lines, the bridging lines are formed to electrically connect parts of the second touch electrode lines disconnected at the intersections, and the first pattern layer is a stress neutral layer of the flexible display panel.

13. The manufacturing method of claim 12, wherein the first pattern layer is further formed to comprise display driving lines arranged in the same layer as the first touch electrode lines and the second touch electrode lines.

14. The manufacturing method of claim 13, wherein the display driving lines comprise data lines.

15. The manufacturing method of claim 13, wherein an extending direction of the first touch electrode lines is parallel to an extending direction of the display driving lines, the display driving lines are arranged in gaps where the second touch electrode lines are disconnected, and orthographic projections of the bridging lines on the flexible substrate partially overlap with orthographic projections of the first touch electrode lines on the flexible substrate.

16. The manufacturing method of claim 12, wherein the first touch electrode lines are configured to receive display driving signals in a display stage and receive touch signals in a touch stage.

17. The manufacturing method of claim 12, further comprising: forming an insulating layer between the first pattern layer and the second pattern layer, wherein the bridging lines electrically connect the parts of the second touch electrode lines disconnected at the intersections through via holes penetrating through the insulating layer.

18. The manufacturing method of claim 12, further comprising: forming a first electrode and a second electrode of a light emitting diode, wherein one of the first electrode and the second electrode is formed in the same layer as the bridging lines.

19. The manufacturing method of claim 12, further comprising: forming a first electrode and a second electrode of a light emitting diode, wherein one of the first electrode and the second electrode is formed in the same layer as the first touch electrode lines and the second touch electrode lines.

20. The manufacturing method of claim 12, further comprising: forming a pixel defining layer comprising a partition portion and a plurality of pixel openings each surrounded by the partition portion, and orthographic projections of the first touch electrode lines and the second touch electrode lines on the flexible substrate and orthographic projections of the bridging lines on the flexible substrate are both located within an orthographic projection of the partition portion on the flexible substrate.

* * * * *